US012804199B2

(12) United States Patent
Nguyen Canh et al.

(10) Patent No.: US 12,804,199 B2
(45) Date of Patent: Nov. 17, 2026

(54) ANGULAR PREDICTION IN MESH PREDICTION

(71) Applicant: TENCENT AMERICA LLC, Palo Alto, CA (US)

(72) Inventors: Thuong Nguyen Canh, Palo Alto, CA (US); Xiaozhong Xu, Palo Alto, CA (US); Shan Liu, Palo Alto, CA (US)

(73) Assignee: Tencent America LLC, Palo Alto, CA (US)

(*) Notice: Subject to any disclaimer, the term of this patent is extended or adjusted under 35 U.S.C. 154(b) by 0 days.

(21) Appl. No.: 19/037,924

(22) Filed: Jan. 27, 2025

(65) Prior Publication Data

US 2025/0247560 A1 Jul. 31, 2025

Related U.S. Application Data

(60) Provisional application No. 63/625,952, filed on Jan. 27, 2024.

(51) Int. Cl.
*H04N 19/105* (2014.01)
*H04N 19/597* (2014.01)

(52) U.S. Cl.
CPC ......... *H04N 19/597* (2014.11); *H04N 19/105* (2014.11)

(58) Field of Classification Search
CPC ........................... H04N 19/597; H04N 19/105
USPC ..................................................... 375/240.12
See application file for complete search history.

(56) References Cited

U.S. PATENT DOCUMENTS

| | | | | |
|---|---|---|---|---|
| 2023/0014820 | A1* | 1/2023 | Zhang | G06T 9/001 |
| 2023/0050860 | A1* | 2/2023 | Ilola | G06T 15/04 |
| 2025/0245862 | A1* | 7/2025 | Nguyen Canh | G06T 17/20 |

* cited by examiner

*Primary Examiner* — Jamie J Atala
*Assistant Examiner* — Mahmoud Kamal Abouzahra
(74) *Attorney, Agent, or Firm* — Crowell & Moring LLP

(57) ABSTRACT

This disclosure relates generally to encoding and decoding of 3-dimensional (3D) mesh and is particularly directed to predicting a 3D mesh position using a predictor from a reference pool having angularly distributed candidate reference positions. For example, when encoding a current position, a set of prior encoded positions may be used to derive a set of reference positions that are distributed as angular and radial grid points in an angular and radial range determined relative to an initial reference position determined using a parallelogram prediction. The reference set may be derivable by both the encoder and the decoder, thereby requiring no signaling other than an index for an optimal predictor selected from the reference position set for encoding the current position.

18 Claims, 13 Drawing Sheets

Across Prediction

Within Prediction

ANGULAR PREDICTION IN MESH PREDICTION

This application is based on and claims the benefit of priority to U.S. Provisional Patent Application No. 63/625,952 filed on Jan. 27, 2024, and entitled "ANGULAR PREDICTION IN MESH PREDICTION," which is herein incorporated by reference in its entirety.

TECHNICAL FIELD

This disclosure relates generally to encoding and decoding of 3-dimensional (3D) mesh and is particularly directed to predicting a 3D mesh position using a predictor from a reference pool having angularly distributed candidate reference positions.

BACKGROUND

This background description provided herein is for the purpose of generally presenting the context of this disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

Various technologies are developed to capture, represent, and simulate real world objects, environments and the like in 3D space. 3D representations of the world can enable more immersive forms of interactive communications. Example 3D representations of objects and environments includes but is not limited to point clouds and meshes. A series of 3D representation of objects and environments may form a video sequence. Redundancies and correlations within the sequence of 3D representations of objects and environments may be utilized for compressing and coding such a video sequence into a more compact digital form.

SUMMARY

This disclosure relates generally to encoding and decoding of 3-dimensional (3D) mesh and is particularly directed to predicting a 3D mesh position using a predictor from a reference pool having angularly distributed candidate reference positions. For example, when encoding a current position, a set of prior encoded positions may be used to derive a set of reference positions that are distributed as angular and radial grid points in an angular and radial range determined relative to an initial reference position determined using a parallelogram prediction. The reference set may be derivable by both the encoder and the decoder, thereby requiring no signaling other than an index for an optimal predictor selected from the reference position set for encoding the current position.

In some example implementations, a method for reconstructing an encode current position from a bitstream of a 3D mesh is disclosed. The method may include determining an anchor position based on a plurality of prior reconstructed positions; determining a reference position set comprising a plurality of reference positions from a set of discrete polar grid points around the anchor position; decoding the bitstream to obtain a reference index for the encoded current position; identifying a target reference position from the reference position set according to the reference index; and reconstructing the encoded current position using the target reference position as a position predictor.

In the example implementations above, the plurality of reference positions in the reference position set comprise N reference positions, N being predefined or signaled in the bitstream.

In any one of the example implementations above, the plurality of prior reconstructed positions comprise a first position, a second position, and a third position reconstructed immediately prior to reconstructing the encoded current position; the anchor position is derived as a mid-position between the first position and the second position; and the set of discrete polar grid points are distributed in a target polar space within a half polar space that is opposite to the third position from a polar axis formed by the first position, the second position, and the anchor position with the anchor position being a polar origin.

In any one of the example implementations above, the set of discrete polar grid points are even in angular distribution in the half polar space.

In any one of the example implementations above, the set of discrete polar grid points are angularly located at 0, $\pi/4$, $\pi/2$, $3\pi/4$, and $\pi$ around the anchor position in the half polar space.

In any one of the example implementations above, the set of discrete polar grid points are in even distribution radially away from the anchor position in the half polar space.

In any one of the example implementations above, the set of discrete polar grid points are located radially away from the anchor position by scaling a distance between the anchor position and the third position by a predefined set of evenly spaced scaling factors.

In any one of the example implementations above, the predefined set of evenly spaced scaling factors are 0.5, 0.75, 1.0, and 1.25.

In any one of the example implementations above, the method may further include determining an initial reference position for the encoded current position in the half polar space; and determining the N reference positions in the reference position set by identifying N of the set of discrete polar grid points nearest to the initial reference position.

In any one of the example implementations above, the initial reference position is determined using a parallelogram extrapolation based on the first position, the second position, and the third position.

In any one of the example implementations above, the method may further include determining an angular range and a radial range in the half polar space for the N reference positions in the reference position set; and deriving the N reference positions as N discrete polar grid points within the angular range and the radial range in the half polar space.

In any one of the example implementations above, the N discrete polar grid points are in even distribution angularly and radially.

In any one of the example implementations above, the method may further include determining an angular width parameter and/or a radial width parameter, the angular width parameter and/or the radial width parameter being predefined or signaled in the bitstream; determining an initial reference position for the encoded current position in the half polar space; and applying the angular width parameter to the initial reference position with clipping between 0 and $\pi$ to obtain the angular range and/or applying the radial width parameter to the initial reference position with clipping between 0 and a maximum radius to obtain the radial range.

In any one of the example implementations above, the initial reference position is determined using a parallelogram extrapolation based on the first position, the second position, and the third position.

In some other example implementations, a method for encoding a current position a 3D mesh is disclosed. The method may include maintaining a plurality of positions encoded prior to the current position; determining an anchor position based on the plurality of positions; determining a reference position set comprising a plurality of reference positions from a set of discrete polar grid points around the anchor position; identifying a target position within the plurality of reference positions in the reference position set as an optimal predictor for the current position; encoding the current position as a residual using the optimal predictor; and including, in an encoded bitstream for the 3D mesh, the residual and an index of the target position within the plurality of reference positions.

In the example implementations above, the plurality of reference positions in the reference position set comprise N reference positions, N being predefined or signaled in the encoded bitstream.

In any one of the example implementations above, the plurality of positions comprise a first position, a second position, and a third position encoded immediately prior to the current position; the anchor position is derived as a mid-position between the first position and the second position; and the set of discrete polar grid points are distributed in a target polar space within a half polar space that is opposite of the third position from a polar axis formed by the first position, the second position, and the anchor position with the anchor position being a polar origin.

In any one of the example implementations above, the method may further include determining an angular range and a radial range in the half polar space for the N reference positions in the reference position set; and deriving the N reference positions as N evenly distributed discrete polar grid points within the angular range and the radial range in the half polar space.

In any one of the example implementations above, the method may further include determining an angular width parameter and/or a radial width parameter, the angular width parameter and/or the radial width parameter being predefined or signaled in the encoded bitstream; determining an initial reference position for encoding the current position in the half polar space, the initial reference position is determined using a parallelogram extrapolation based on the first position, the second position, and the third position; and applying the angular width parameter to the initial reference position with clipping between 0 and $\pi$ to obtain the angular range and/or applying the radial width parameter to the initial reference position with clipping between 0 and a maximum radius to obtain the radial range.

Aspects of the disclosure also provide an electronic device or apparatus function as encoder or decoder including a circuitry configured to carry out any of the method implementations above.

Aspects of the disclosure also provide non-transitory computer-readable medium for storing computer instructions which when executed by a computer for 3D mesh processing, cause the computer to perform any one of the method implementations above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
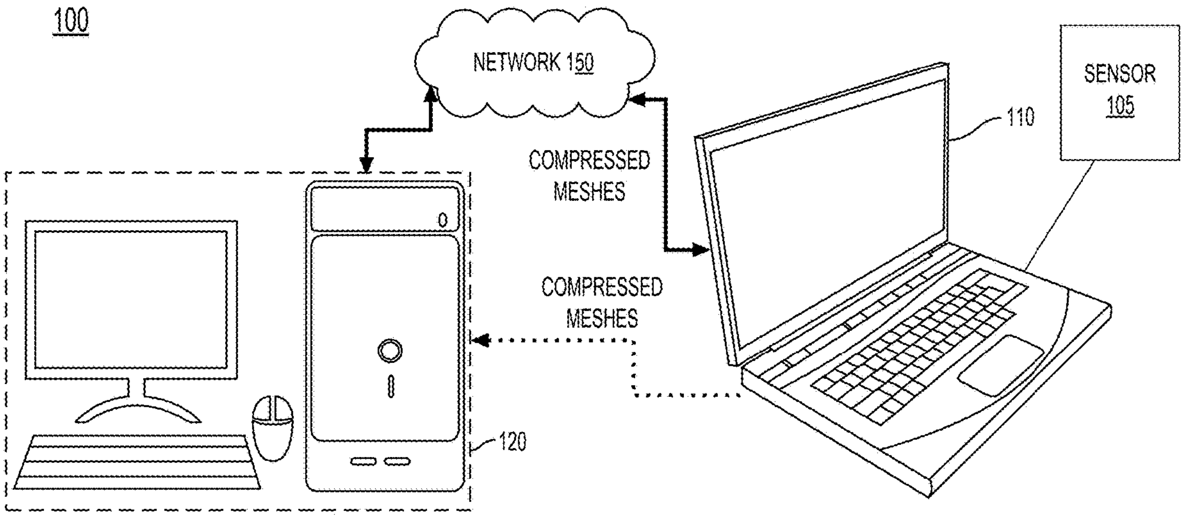
FIG. 1 is a schematic illustration of a simplified block diagram of an example communication system in accordance with an embodiment of this disclosure.

Throughout this specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Technological developments in 3D media processing, such as advances in 3D capture, 3D modeling, and 3D rendering, and the like have promoted the ubiquitous creation of 3D contents across several platforms and devices. Such 3D contents contain information that may be processed to generate various forms of media to provide, for example, immersive viewing/rendering and interactive experience. Applications of 3D contents are abundant, including but not limited to virtual reality, augmented reality, metaverse interactions, gaming, immersive video conferencing, robotics, computer-aided design (CAD), and the like. According to an aspect of this disclosure, in order to improve immersive experience, 3D models are becoming ever more sophisticated, and the creation and consumption of 3D models demand a significant amount of data resources, such as data storage, data transmission resources, and data processing resources.

In comparison to traditional 2-dimensional (2D) contents that are generally represented by datasets in the form of 2D pixel arrays (such as images), 3D contents with three-dimensional full-resolution pixilation may be prohibitively resource intensive and are nevertheless unnecessary in many if not most practical applications. In most 3D immersive applications, according to some aspects of the disclosure, less data intensive representations of 3D contents may be employed. For example, in most applications, only topographical information rather than volumetric information of objects in a 3D scene (either real-world scene captured by sensors such as LIDAR devices or an animated 3D scene generated by software tools) may be necessary. As such, datasets in more efficient forms may be used to represent 3D objects and 3D scenes. For example, 3D meshes may be used as a type of 3D models to represent immersive 3D contents, such as 3D objects in 3D scenes.

A mesh (alternatively referred to as mesh model) of one or more objects may include a collection of vertices. The vertices may connect to one another to form edges. The edges may further connect to form faces. The faces may further form polygons. 3D surfaces of various objects may be decomposed into, for example, faces and polygons. Each of the vertices, edges, faces, polygons, or surfaces may be associated with various attributes such as color, surface normal, texture, and the like. A normal for a surface may be referred as the surface normal; and/or the normal for a vertex may be referred as the vertex normal. The information of how the vertices are connected into edges, faces or polygons may be referred to as connectivity information. The connectivity information is important for uniquely defining components of a mesh since the same set of vertices can form different faces, surfaces, and polygons. In general, a position of a vertex in the 3D space may be represented by its 3D coordinates. A face may be represented by a set of sequentially connected vertices, each associated with a set of 3D coordinates. Likewise, an edge may be represented by two vertices each associated with its 3D coordinates. The vertices, edges, and faces may be indexed in the 3D mesh datasets.

A mesh may be defined and described by a collection of one or more of these fundamental element types. However, not all types of elements above are necessary in order to fully describe a mesh. For example, a mesh may be fully described by using just vertices and their connectivity. For another example, a mesh may be fully described by just using a list of faces and common vertices of faces. As such, a mesh can be of various alternative types described by alternative dataset compositions and formats. Example mesh types include but are not limited to face-vertex meshes, winged-edge meshes, half-edge meshes, quad-edge meshes, corner-table meshes, vertex-vertex meshes, and the like. Correspondingly, a mesh dataset may be stored with information in compliance with alternative file formats with file extensions including but not limited to .raw, .blend, .fbx, 0.3ds, .dae, .dng, 3dm, .dsf, .dwg, .obj, .ply, .pmd, .stl, amf, .wrl, .wrz, .x3d, .x3db, .x3dv, .x3dz, .x3dbz, .x3dvz, .c4d, .lwo, .smb, .msh, .mesh, .veg, .z3d, .vtk, .l4d, and the like. Attributes for these elements, such as color, surface normal, texture, and the like may be included into a mesh dataset in various manners.

In some implementations, vertices of a mesh may be mapped into a pixelated 2D space, referred to as a UV space. As such, each vertex of the mesh may be mapped to a pixel in the UV space. In some implementations, one vertex may be mapped to more than one pixel in the UV space, for example, a vertex at a boundary may be mapped to two or three pixels in the UV space. Likewise, a face or surface in the mesh may be sampled into a plurality of 3D points that may or may not be among recorded vertices in the mesh, and these plurality of 3D points may be also mapped to pixels in the 2-dimensional UV space. Mapping the vertices and sampled 3D points of faces or surfaces in a mesh into the UV space and the subsequent data analytics and processing in the UV space may facilitate data storage, compression, and coding of 3D dataset of a mesh or a sequence of mesh. A mapped UV space dataset may be referred to as a UV image, or 2D map, or a 2D image of the mesh.

While the example implementations above focus on a mesh that is static, according to an aspect of the disclosure, 3D meshes may be dynamic. A dynamic mesh, for example, may refer to a mesh where at least one of the components (geometry information, connectivity information, mapping information, vertex attributes and attribute maps) varies with time. As such, a dynamic mesh can be described by a sequence of meshes or meshes (also referred to as mesh frames), analogous to a timed sequence of 2D image frames that form a video.

In some example implementations, a dynamic mesh may have constant connectivity information, time varying geometry and time varying vertex attributes. In some other examples, a dynamic mesh can have time varying connectivity information. In some examples, digital 3D content creation tools may be used to generate dynamic meshes with time varying attribute maps and time varying connectivity information. In some other examples, volumetric acquisition/detection/sensing techniques are used to generate dynamic meshes. The volumetric acquisition techniques can generate a dynamic mesh with time varying connectivity information especially under real-time constraints.

A dynamic mesh may require a large amount of data since the dynamic mesh may include a significant amount of information changing over time. However, compression may be performed to take advantage of redundancies within a mesh frame (intra-compression) and between mesh frames (inter-compression). Various mesh compression processes may be implemented to allow efficient storage and transmission of media contents in the mesh representation, particularly for a mesh sequence.

Aspects of the disclosure provide example architectures and techniques for mesh compression. The techniques may be used for various mesh compression including but not limited to static mesh compression, dynamic mesh compression, compression of a dynamic mesh with constant connectivity information, compression of a dynamic mesh with time varying connectivity information, compression of a dynamic mesh with time varying attribute maps, and the like. The techniques may be used in lossy and lossless compression for various applications, such as real-time immersive communications, storage, free viewpoint video, augmented reality (AR), virtual reality (VR), and the like. The applications can include functionalities such as random access and scalable/progressive coding.

While this disclosure explicitly describes techniques and implementations applicable to 3D meshes, the principles underlying the various implementations described herein are applicable to other types of 3D data structures, including but not limited to Point Cloud (PC) data structures. For simplicity, references to 3D meshes below are intended to be general and include other type of 3D representations such as point clouds and other 3D volumetric datasets.

Turning first to example architectural level implementations, FIG. 1 illustrates a simplified block diagram of a communication system (100) according to an example embodiment of the present disclosure. The communication system (100) may include a plurality of terminal devices that can communicate with one another, via, for example, a communication network (150) (alternatively referred to as a network). For example, the communication system (100) may include a pair of terminal devices (110) and (120) interconnected via the network (150). In the example of FIG. 1, the first pair of terminal devices (110) and (120) may perform unidirectional transmission of 3D meshes. For example, the terminal device (110) may compress a 3D mesh or a sequence of 3D meshes, which may be generated by the terminal device (110) or obtained from a storage or captured by a 3D sensor (105) connected with the terminal device (110). The compressed 3D mesh or sequence of 3D meshes may be transmitted, for example in the form of a bitstream (also referred as a coded bitstream), to the other terminal device (120) via the network (150). The terminal device (120) may receive the compressed 3D mesh or sequence of 3D meshes from the network (150), decompress the bitstream to reconstruct the original 3D mesh or sequence of 3D meshes, and suitably process the reconstructed 3D mesh or sequence of 3D meshes for display or for other purposes/uses. Unidirectional data transmission may be common in media serving applications and the like.

In the example of FIG. 1, either one or both of the terminal devices (110) and (120) may be implemented as servers, fixed or mobile personal computers, laptop computers, tablet computers, smart phones, gaming terminals, media players, and/or dedicated three-dimensional (3D) equipment and the like, but the principles of the present disclosure may be not so limited. The network (150) may represent any type of network or combination of networks that transmit compressed 3D meshes between the terminal devices (110) and (120). The network (150) can include, for example, wireline (wired) and/or wireless communication networks. The network (150) may exchange data in circuit-switched and/or packet-switched channels. Representative networks include long-haul telecommunications networks, local area networks, wide area networks, cellular networks, and/or the Internet. For the purposes of the present disclosure, the architecture and topology of the network (150) may be immaterial to the operation of the present disclosure unless explained herein below.

Figure 2:
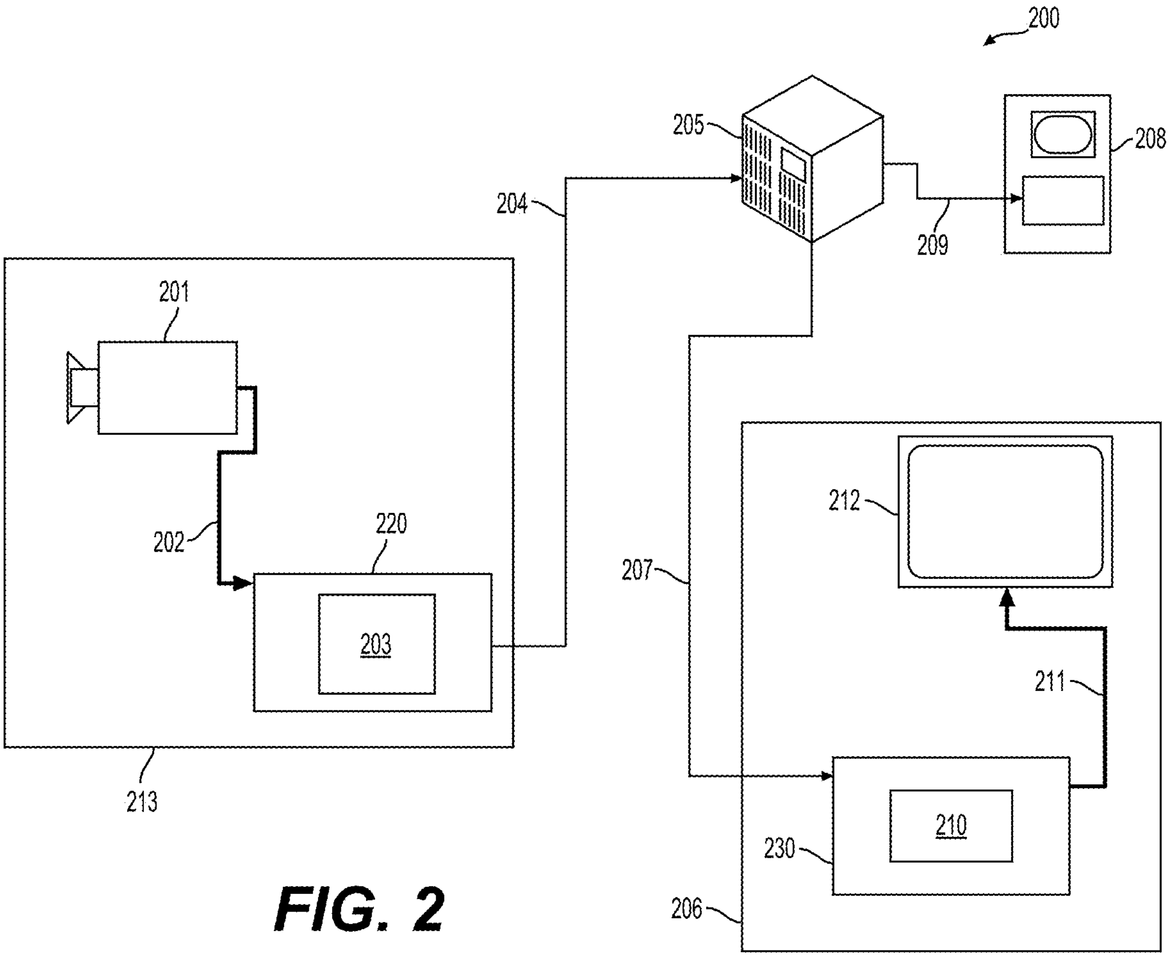
FIG. 2 is a schematic illustration of a simplified block diagram of an example streaming system in accordance with an embodiment of this disclosure.

FIG. 2 illustrates an example simplified block diagram of a streaming system (200) in accordance with an embodiment of this disclosure. The FIG. 2 illustrates an example application for the disclosed implementations related to 3D meshes and compressed 3D meshes. The disclosed subject matter can be equally applicable to other 3D mesh or point cloud enabled applications, such as, 3D telepresence application, virtual reality application, and the like.

The streaming system (200) may include a capture or storage subsystem (213). The capture or storage subsystem (213) may include 3D mesh generator or storage medium (201), e.g., a 3D mesh or point cloud generation tool/software, a graphics generation component, or a point cloud sensor such as a light detection and ranging (LIDAR) systems, 3D cameras, 3D scanners, a 3D mesh store and the like that generate or provide 3D mesh (202) or point clouds (202) that are uncompressed. In some example implementations, the 3D meshes (202) include vertices of a 3D mesh or 3D points of a point cloud (both referred to as 3D mesh). The 3D meshes (202), depicted as a bold line to emphasize a corresponding high data volume when compared to compressed 3D meshes (204) (a bitstream of compressed 3D meshes). The compressed 3D meshes (204) may be generated by an electronic device (220) that includes an encoder (203) coupled to the 3D meshes (202). The encoder (203) can include hardware, software, or a combination thereof to enable or implement aspects of the disclosed subject matter as described in more detail below. The compressed 3D meshes (204) (or bitstream of compressed 3D meshes (204)), depicted as a thin line to emphasize the lower data volume when compared to the stream of uncompressed 3D meshes (202), can be stored in a streaming server (205) for future use. One or more streaming client subsystems, such as client subsystems (206) and (208) in FIG. 2 can access the streaming server (205) to retrieve copies (207) and (209) of the compressed 3D meshes (204). A client subsystem (206) may include a decoder (210), for example, in an electronic device (230). The decoder (210) may be configured to decode the incoming copy (207) of the compressed 3D meshes and create an outgoing stream of reconstructed 3D meshes (211) that can be rendered on a rendering device (212) or for other uses.

It is noted that the electronic devices (220) and (230) can include other components (not shown). For example, the electronic device (220) can include a decoder (not shown) and the electronic device (230) can include an encoder (not shown) as well.

In some streaming systems, the compressed 3D meshes (204), (207), and (209) (e.g., bitstreams of compressed 3D meshes) can be compressed according to certain standards. In some examples, as described in further detail below, video coding standards are used to take advantage of redundancies and correlations in the compression of 3D meshes after the 3D mesh is first projected to mapped into 2D representations suitable for video compression. Non-limiting examples of those standards include, High Efficiency Video Coding (HEVC), Versatile Video Coding (VVC), and the like, as described in further detail below.

Figure 3:
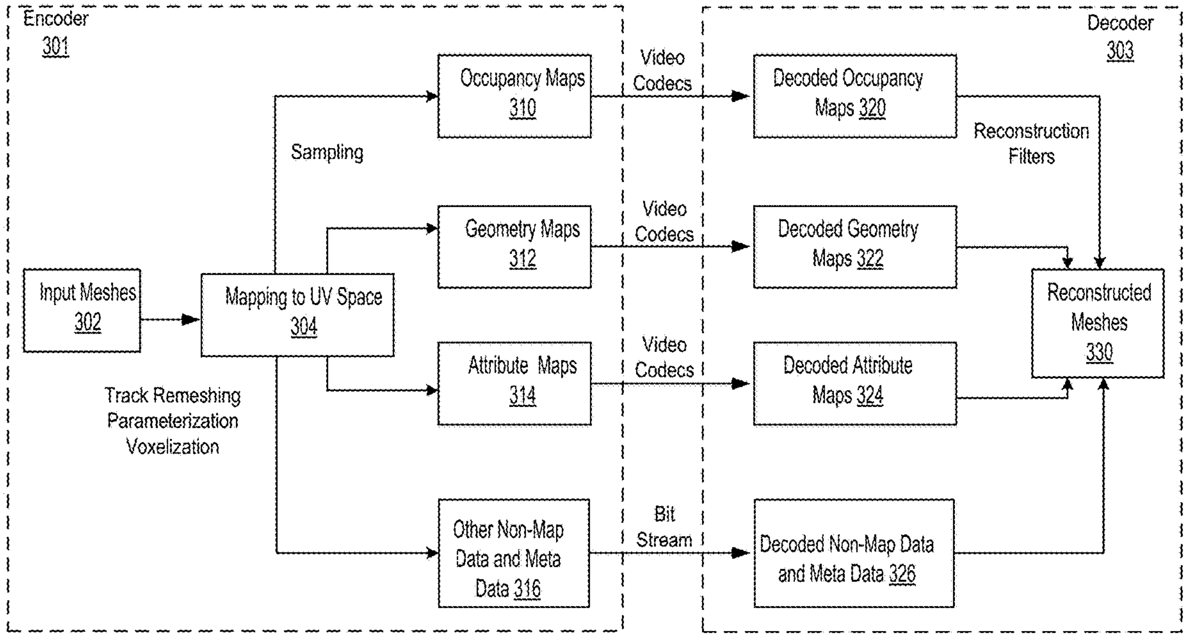
FIG. 3 shows a data flow in an encoding and decoding of 3D mesh or point cloud frames according to some embodiments of this disclosure.

The compressed 3D mesh or sequence of 3D meshes may be generated by an encoder whereas a decoder may be configured to decompress the compressed or coded 3D meshes. FIG. 3 illustrates a high-level example data flow of 3D meshes in such an encoder (301) and decoder (303). As shown in FIG. 3, a raw input 3D mesh or a sequence of 3D meshes (302) may be preprocessed by track remeshing, parameterization, and/or voxelization to generate input data to a mapping unit for mapping the 3D meshes to a 2D UV space (304), which, in some implementations, may include meshes with UV atlas. The 3D meshes may be sampled to include 3D surface points that may not be among the vertices and add these sampled 3D surface points in the mapping to the UV space. Various 2D maps may be generated in the encoder 301, including but not limited to occupancy maps (310), geometry maps (312), attribute maps (314). These image type of maps may be compressed by the encoder 301 using, for example, video coding/compression technologies. For example, a video coder may help compressing a 3D mesh frame using intra-prediction techniques and inter-prediction by other 3D mesh reference frames. Other non-image or non-map data or meta data (316) may also be coded in various manner to remove redundancies to generate compressed non-map data, for non-limiting example, via entropy coding. The encoder 301 may then combine or multiplex the compressed 2D maps and non-map data and further coding the combined data to generate an encoded bitstream (alternatively referred as coded bitstream). The encoded bitstream may then be stored or transmitted for use by the decoder 303. The decoder may be configured to decode the bitstream, demultiplex the decoded bitstream to obtain the compressed 2D maps and non-map data, and preform decompression to generate decoded occupancy maps (320), decoded geometry maps (322), decoded attribute maps (324), and decoded non-map data and meta data (326). The decoder 303 may then further be configured to reconstruct the 3D mesh or sequence of 3D meshes (330) from the decoded 2D maps (320, 322, and 324) and decoded non-map data (326).

Figure 4:
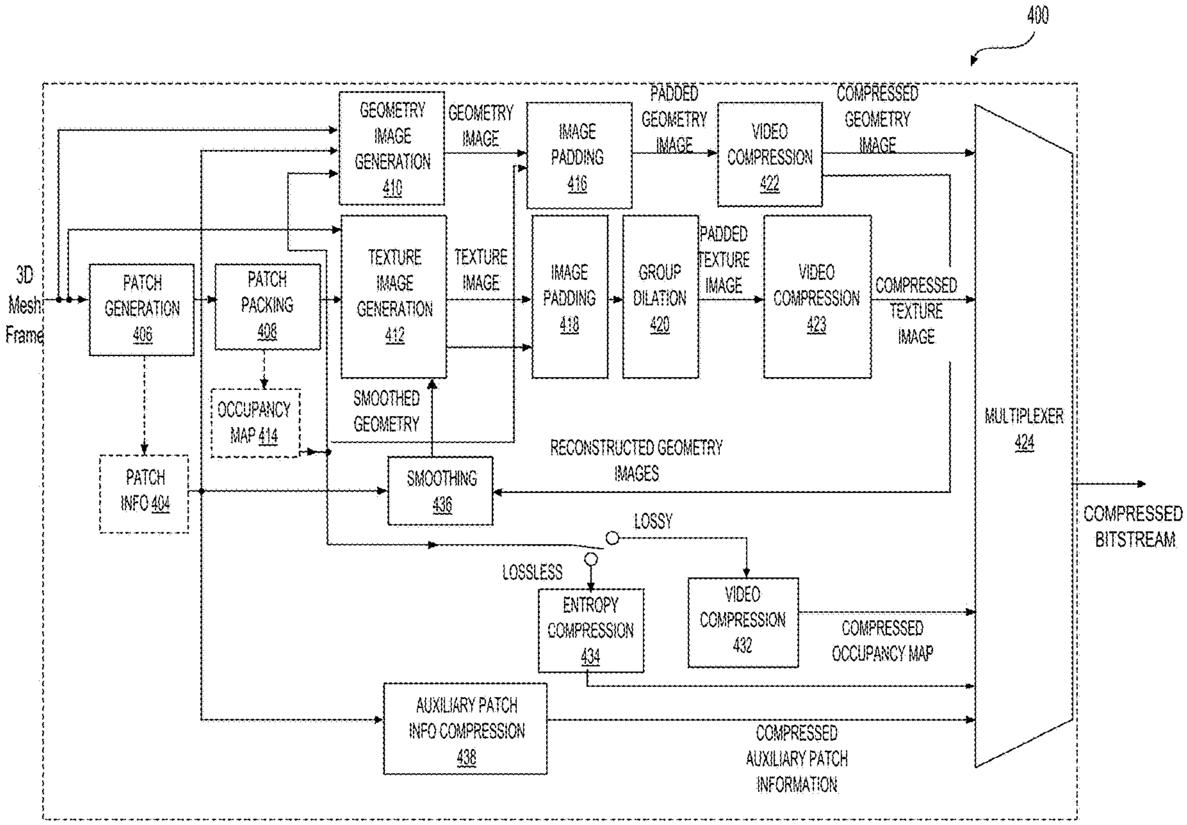
FIG. 4 shows a block diagram of an encoder for encoding 3D mesh or point cloud frames, according to some embodiments of this disclosure.

In further detail, FIG. 4 shows a block diagram of an example 3D mesh encoder (400) for encoding 3D mesh frames, according to some embodiments of this disclosure. In some example implementations, the mesh encoder (400) may be used in the communication system (100) and streaming system (200). For example, the encoder (203) can be configured and operate in a similar manner as the mesh encoder (400).

The mesh encoder (400) may receive 3D mesh frames as uncompressed inputs and generate bitstream corresponding to compressed 3D mesh frames. In some example implementations, the mesh encoder (400) may receive the 3D mesh frames from any source, such as the mesh or point cloud source (201) of FIG. 2 and the like.

In the example of FIG. 4, the mesh encoder (400) may include a patch generation module (406) (alternatively referred to chart generation module), a patch packing module (408), a geometry image generation module (410), a texture image generation module (412), a patch info module (404), an occupancy map module (414), a smoothing module (436), image padding modules (416) and (418), a group dilation module (420), video compression modules (422), (423) and (432), an auxiliary patch info compression module (438), an entropy compression module (434), and a multiplexer (424).

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also may apply to the term module and other equivalent terms (e.g., unit).

According to an aspect of the disclosure, and as descried above, the mesh encoder (400), converts 3D mesh frames into image-based representations (e.g., 2D maps) along with some non-map meta data (e.g., patch or chart info) that is used to assist converting the compressed 3D mesh back into a decompressed 3D mesh. In some examples, the mesh encoder (400) may convert 3D mesh frames into 2D geometry maps or images, texture maps or images and occupancy maps or images, and then use video coding techniques to encode the geometry images, texture images and occupancy maps into a bitstream along with the meta data and other compressed non-map data. Generally, and as described above, a 2D geometry image is a 2D image with 2D pixels filled with geometry values associated with 3D points projected (the term "projected" is used to mean "mapped") to the 2D pixels, and a 2D pixel filled with a geometry value may be referred to as a geometry sample. A texture image is a 2D image with pixels filled with texture values associated with 3D points projected to the 2D pixels, and a 2D pixel filled with a texture value may be referred to as a texture sample. An occupancy map is a 2D image with 2D pixels filled with values that indicate occupation or non-occupation by 3D points.

The patch generation module (406) segments a 3D mesh into a set of charts or patches (e.g., a patch is defined as a contiguous subset of the surface described by the 3D mesh or point cloud), which may or may not be overlapping, such that each patch may be described by a depth field with respect to a plane in 2D space (e.g., flattening of the surface such that deeper 3D points on the surface is further away from center of the corresponding 2D map). In some embodiments, the patch generation module (406) aims at decomposing the 3D mesh into a minimum number of patches with smooth boundaries, while also minimizing the reconstruction error.

The patch info module (404) can collect the patch information that indicates sizes and shapes of the patches. In some examples, the patch information can be packed into a data frame and then encoded by the auxiliary patch info compression module (438) to generate the compressed auxiliary patch information. The auxiliary patch compression may be implemented in various forms, including but not limited to various types of arithmetic coding.

The patch or chart packing module (408) may be configured to map the extracted patches onto a 2D grid of the UV space while minimize the unused space. In some example implementations, the pixels of the 2D UV space may granularized to blocks of pixels for mapping of the patches or charts. The block size may be predefined. For example, the block size may be M be M×M (e.g., 16×16). With such granularity, it may be guaranteed that every M×M block of the 2D UV grid is associated with a unique patch. In other words, each patch is mapped to the 2D UV space with a 2D granularity of M×M. Efficient patch packing can directly impact the compression efficiency either by minimizing the unused space or ensuring temporal consistency. Examples implementations of packing of the patches or charts into the 2D UV space are given in further detail below.

The geometry image generation module (410) can generate 2D geometry images associated with geometry of the 3D mesh at given patch locations in the 2D grid. The texture image generation module (412) can generate 2D texture images associated with texture of the 3D mesh at given patch locations in the 2D grid. The geometry image generation module (410) and the texture image generation module (412) essentially exploit the 3D to 2D mapping computed during the packing process above to store the geometry and texture of the 3D mesh as 2D images, as described above. In some implementations, in order to better handle the case of multiple points being projected to the same sample (e.g., the patches overlap in the 3D space of the mesh), the 2D image may be layered. In other words, each patch may be projected onto, e.g., two images, referred to as layers, such that the multiple points can be projected into the same points in the different layers.

In some example implementations, a geometry image may be represented by a monochromatic frame of width×height (W×H). As such, three geometry images of the 3 luma or chroma channels may be used to represents the 3D coordinates. In some example implementations, a geometry image may be represented by a 2D image having three channels (RGB, YUV, YCrCb, and the like) with a certain color depth (e.g., 8-bit, 12-bit, 16-bit, or the like). As such, one geometry image having the 3 color channels may be used to represents the 3D coordinates.

To generate the texture image, the texture generation procedure exploits the reconstructed/smoothed geometry in order to compute the colors to be associated with the sampled points from the original 3D mesh (see "sampling" of FIG. 3, which, for example, would generate 3D surface points not among the vertices of the original 3D mesh).

The occupancy map module (414) may be configured to generate an occupancy map that describes padding information at each unit. For example, as described above, the occupancy image may include a binary map that indicates for each cell of the 2D grid whether the cell belongs to the empty space or to the 3D mesh. In some example implementations, the occupancy map may use binary information to describe for each pixel whether the pixel is padded or not. In some other example implementations, the occupancy map may use binary information to describe for each block of pixels (e.g., each M×M block) whether the block of pixels is padded or not.

The occupancy map generated by the occupancy map module (414) may be compressed using lossless coding or lossy coding. When lossless coding is used, the entropy compression module (434) may be used to compress the occupancy map. When lossy coding is used, the video compression module (432) may be used to compress the occupancy map.

It is noted that the patch packing module (408) may leave some empty spaces between 2D patches packed in an image frame. The image padding modules (416) and (418) may fill the empty spaces (referred to as padding) in order to generate an image frame that may be suited for 2D video and image codecs. The image padding is also referred to as background filling which can fill the unused space with redundant information. In some examples, a well-implemented background filling minimally increases the bit rate while avoiding introducing significant coding distortion around the patch boundaries.

The video compression modules (422), (423), and (432) can encode the 2D images, such as the padded geometry images, padded texture images, and occupancy maps based on a suitable video coding standard, such as HEVC, VVC and the like. In some example implementations, the video compression modules (422), (423), and (432) are individual components that operate separately. It is noted that the video compression modules (422), (423), and (432) can be implemented as a single component in some other example implementations.

In some example implementations, the smoothing module (436) may be configured to generate a smoothed image of the reconstructed geometry image. The smoothed image can be provided to the texture image generation (412). Then, the texture image generation (412) may adjust the generation of the texture image based on the reconstructed geometry images. For example, when a patch shape (e.g. geometry) is slightly distorted during encoding and decoding, the distortion may be taken into account when generating the texture images to correct for the distortion in the patch shape.

In some embodiments, the group dilation (420) is configured to pad pixels around the object boundaries with redundant low-frequency content in order to improve coding gain as well as visual quality of reconstructed 3D mesh.

The multiplexer (424) may be configured to multiplex the compressed geometry image, the compressed texture image, the compressed occupancy map, the compressed auxiliary patch information into a compressed bitstream.

Figure 5:
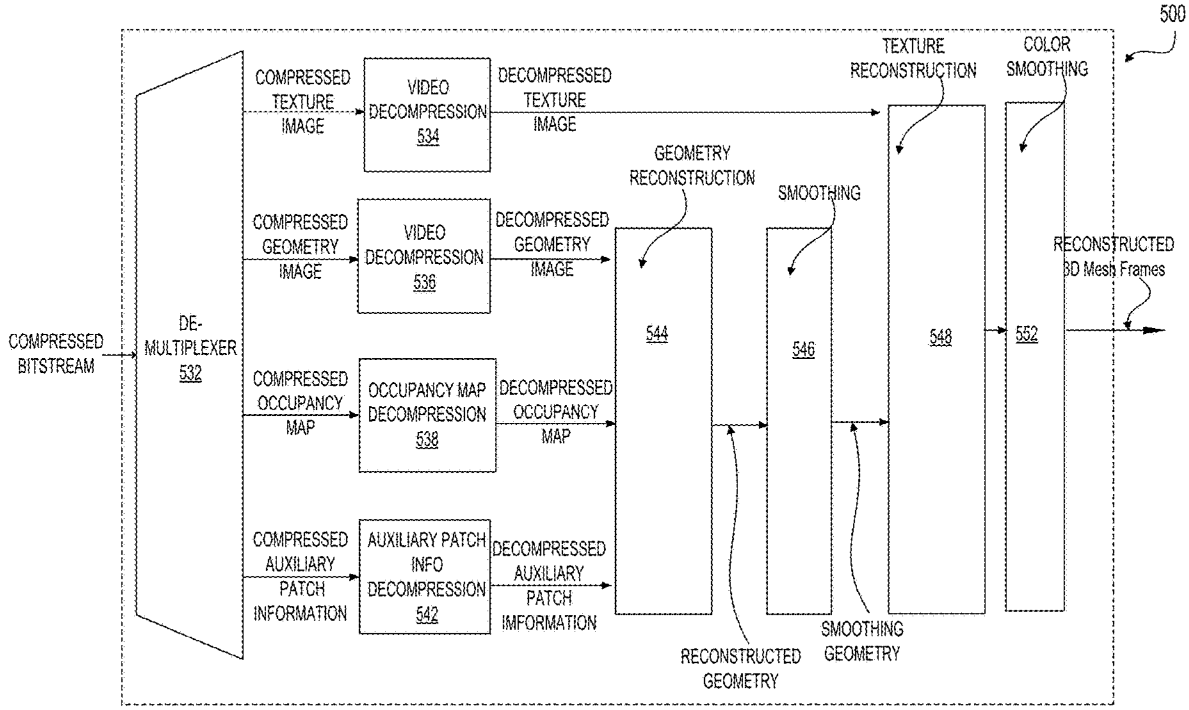
FIG. 5 shows a block diagram of a decoder for decoding a compressed bitstream corresponding to 3D mesh and point cloud frames according to some embodiments of this disclosure.

FIG. 5 shows a block diagram of an example mesh decoder (500) for decoding compressed bitstream corresponding to 3D mesh frames, according to some embodiments of this disclosure. In some example implementations, the mesh decoder (500) can be used in the communication system (100) and streaming system (200). For example, the decoder (210) can be configured to operate in a similar manner as the mesh decoder (500). The mesh decoder (500) receives the compressed bitstream, and generates reconstructed 3D meshes based on the compressed bitstream including, for example, the compressed geometry image, the compressed texture image, the compressed occupancy map, the compressed auxiliary patch information.

In the example of FIG. 5, the mesh decoder (500) may include a de-multiplexer (532), video decompression modules (534) and (536), an occupancy map decompression module (538), an auxiliary patch-information decompression module (542), a geometry reconstruction module (544), a smoothing module (546), a texture reconstruction module (548), and a color smoothing module (552).

The de-multiplexer (532) may receive and separate the compressed bitstream into compressed texture image, compressed geometry image, compressed occupancy map, and compressed auxiliary patch information.

The video decompression modules (534) and (536) can decode the compressed images according to a suitable standard (e.g., HEVC, VVC, etc.) and output decompressed images. For example, the video decompression module (534) may decode the compressed texture images and output decompressed texture images. The video decompression module (536) may further decode the compressed geometry images and outputs the decompressed geometry images.

The occupancy map decompression module (538) may be configured to decode the compressed occupancy maps according to a suitable standard (e.g., HEVC, VVC, etc.) and output decompressed occupancy maps.

The auxiliary patch-information decompression module (542) may be configured to decode the compressed auxiliary patch information according to a suitable decoding algorithm and output decompressed auxiliary patch information.

The geometry reconstruction module (544) may be configured to receive the decompressed geometry images, and generate reconstructed 3D mesh geometry based on the decompressed occupancy map and decompressed auxiliary patch information.

The smoothing module (546) may be configured to smooth incongruences at edges of patches. The smoothing procedure may be aimed at alleviating potential discontinuities that may arise at the patch boundaries due to compression artifacts. In some example implementations, a smoothing filter may be applied to the pixels located on the patch boundaries to alleviate the distortions that may be caused by the compression/decompression.

The texture reconstruction module (548) may be configured to determine texture information for points in the 3D meshes based on the decompressed texture images and the smoothing geometry.

The color smoothing module (552) may be configured to smooth incongruences of coloring. Non-neighboring patches in 3D space are often packed next to each other in 2D videos. In some examples, pixel values from non-neighboring patches might be mixed up by the block-based video codec. The goal of color smoothing may be to reduce the visible artifacts that appear at patch boundaries.

Figure 6:
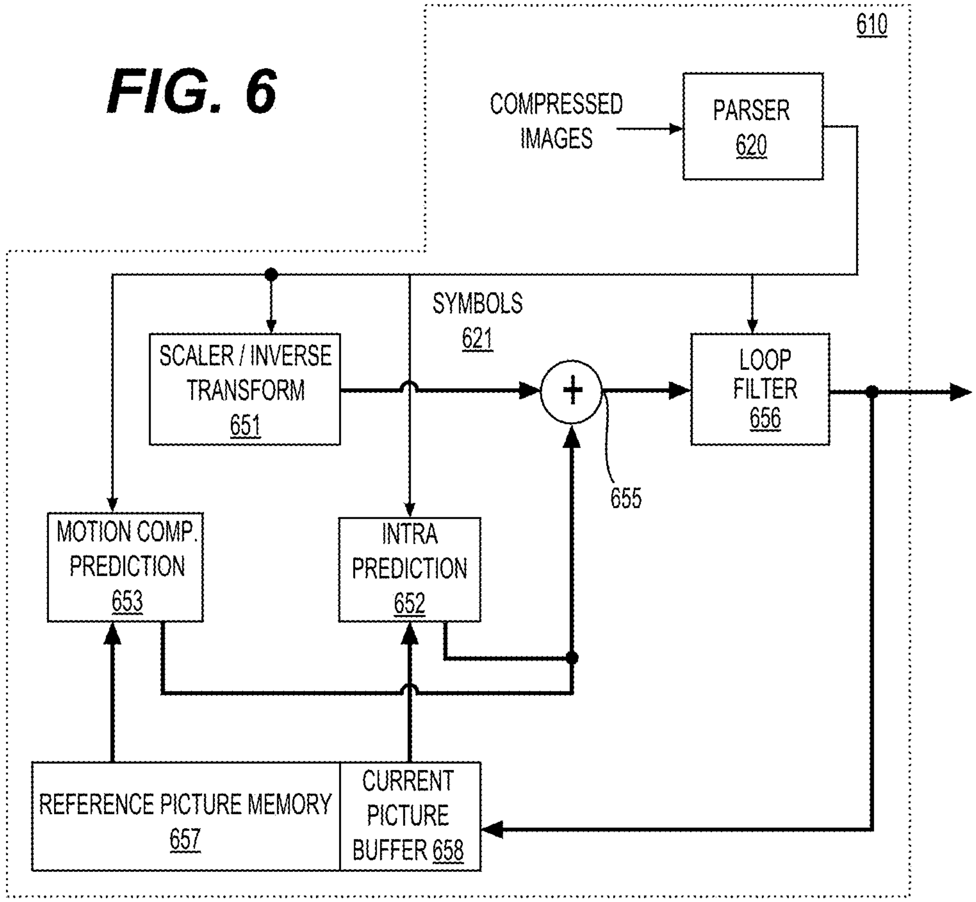
FIG. 6 is a schematic illustration of a simplified block diagram of a video decoder in accordance with an embodiment of this disclosure.

FIG. 6 shows a block diagram of an example video decoder (610) according to an embodiment of the present disclosure. The video decoder (610) may be used in the mesh decoder (500). For example, the video decompression modules (534) and (536), the occupancy map decompression module (538) may be similarly configured as the video decoder (610).

The video decoder (610) may include a parser (620) to reconstruct symbols (621) from compressed images, such as the coded video sequence. Categories of those symbols may include information used to manage operation of the video decoder (610). The parser (620) may parse/entropy-decode the coded video sequence being received. The coding of the coded video sequence can be in accordance with a video coding technology or standard, and can follow various principles, including variable length coding, Huffman coding, arithmetic coding with or without context sensitivity, and so forth. The parser (620) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (620) may also extract from the coded video sequence information such as transform coefficients, quantizer parameter values, motion vectors, and so forth.

The parser (620) may perform an entropy decoding/parsing operation on the image sequence received from a buffer memory, so as to create symbols (621).

Reconstruction of the symbols (621) can involve multiple different units depending on the type of the coded video picture or parts thereof (such as: inter and intra picture, inter and intra block), and other factors. Which units are involved, and how, may be controlled by the subgroup control information that was parsed from the coded video sequence by the parser (620). The flow of such subgroup control information between the parser (620) and the multiple units below is not depicted for clarity.

Beyond the functional blocks already mentioned, the video decoder (610) can be conceptually subdivided into a number of functional units as described below. In a practical implementation operating under commercial constraints, many of these units interact closely with each other and can, at least partly, be integrated into each other. The conceptual subdivision into the functional units below is made merely for the purpose of describing the disclosed subject matter.

The video decoder (610) may include a scaler/inverse transform unit (651). The scaler/inverse transform unit (651) may receive a quantized transform coefficient as well as control information, including which transform to use, block size, quantization factor, quantization scaling matrices, etc. as symbol(s) (621) from the parser (620). The scaler/inverse transform unit (651) may output blocks comprising sample values that can be input into aggregator (655).

In some cases, the output samples of the scaler/inverse transform (651) can pertain to an intra coded block; that is: a block that is not using predictive information from previously reconstructed pictures, but can use predictive information from previously reconstructed parts of the current picture. Such predictive information can be provided by an intra picture prediction unit (652). In some cases, the intra picture prediction unit (652) may generate a block of the same size and shape of the block under reconstruction, using surrounding already reconstructed information fetched from the current picture buffer (658). The current picture buffer (658) may buffer, for example, partly reconstructed current picture and/or fully reconstructed current picture. The aggregator (655), in some cases, may add, on a per sample basis, the prediction information that the intra prediction unit (652) has generated to the output sample information as provided by the scaler/inverse transform unit (651).

In other cases, the output samples of the scaler/inverse transform unit (651) can pertain to an inter coded, and potentially motion compensated block. In such a case, a motion compensation prediction unit (653) can access reference picture memory (657) to fetch samples used for prediction. After motion compensating the fetched samples in accordance with the symbols (621) pertaining to the block, these samples may be added by the aggregator (655) to the output of the scaler/inverse transform unit (651) (in this case called the residual samples or residual signal) so as to generate output sample information. The addresses within the reference picture memory (657) from where the motion compensation prediction unit (653) fetches prediction samples can be controlled by motion vectors, available to the motion compensation prediction unit (653) in the form of symbols (621) that can have, for example X, Y, and reference picture components. Motion compensation also may include interpolation of sample values as fetched from the reference picture memory (657) when sub-sample exact motion vectors are in use, motion vector prediction mechanisms, and so forth.

The output samples of the aggregator (655) may be subject to various loop filtering techniques in the loop filter unit (656). Video compression technologies may include in-loop filter technologies that are controlled by parameters included in the coded video sequence (also referred to as coded video bitstream) and made available to the loop filter unit (656) as symbols (621) from the parser (620), but may also be responsive to meta-information obtained during the decoding of previous (in decoding order) parts of the coded picture or coded video sequence, as well as responsive to previously reconstructed and loop-filtered sample values.

The output of the loop filter unit (656) may be a sample stream that can be output to a render device as well as stored in the reference picture memory (657) for use in future inter-picture prediction.

Certain coded pictures, once fully reconstructed, may be used as reference pictures for future prediction. For example, once a coded picture corresponding to a current picture is fully reconstructed and the coded picture has been identified as a reference picture (by, for example, the parser (620)), the current picture buffer (658) may become a part of the reference picture memory (657), and a fresh current picture buffer may be reallocated before commencing the reconstruction of the following coded picture.

The video decoder (610) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile may select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 7:
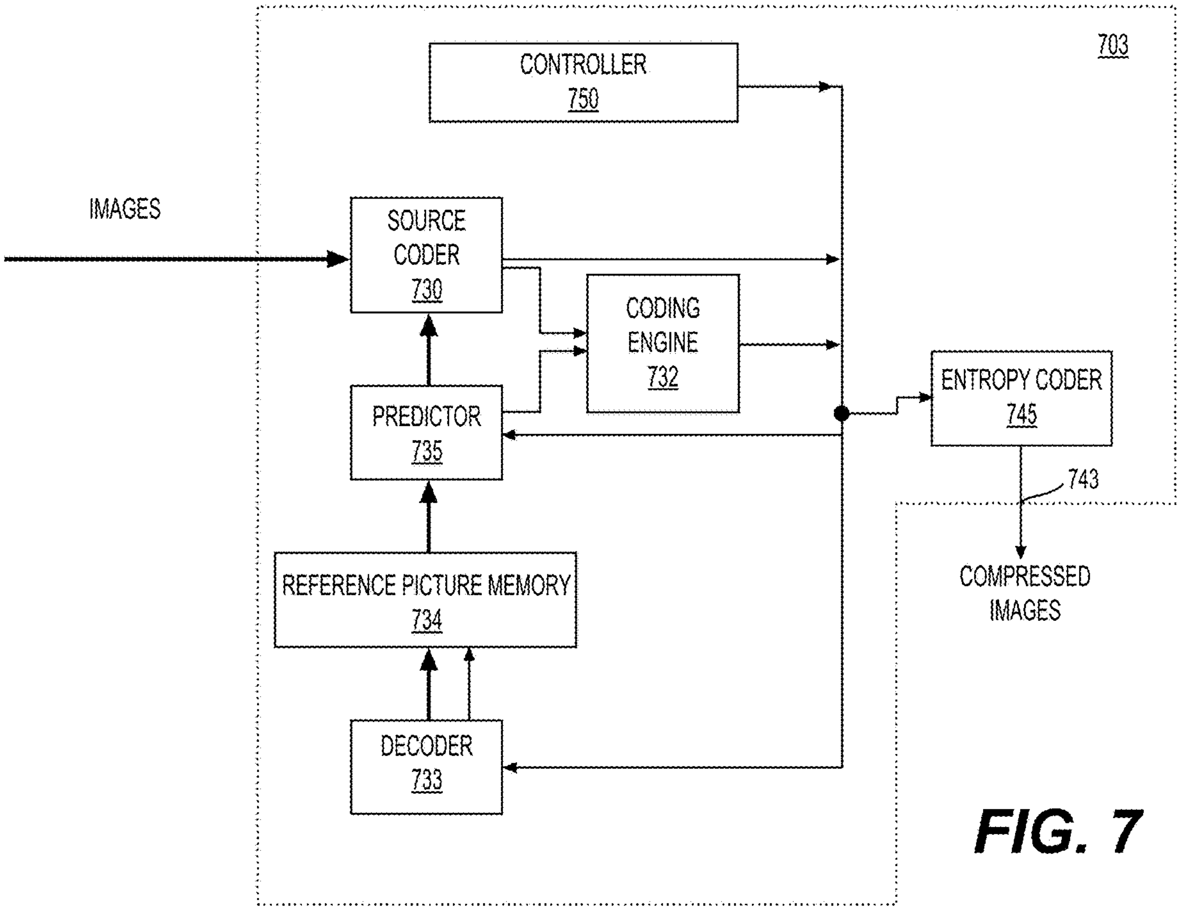
FIG. 7 is a schematic illustration of a simplified block diagram of a video encoder in accordance with an embodiment of this disclosure.

FIG. 7 shows a block diagram of a video encoder (703) according to an embodiment of the present disclosure. The video encoder (703) can be used in the mesh encoder (400) that compresses 3D meshes or point clouds. In some example implementations, the video compression module (422) and (423), and the video compression module (432) are configured similarly to the encoder (703).

The video encoder (703) may receive 2D images, such as padded geometry images, padded texture images and the like, and generate compressed images.

According to an example embodiment of this disclosure, the video encoder (703) may code and compress the pictures of the source video sequence (images) into a coded video sequence (compressed images) in real-time or under any other time constraints as required by the application. Enforcing appropriate coding speed is one function of a controller (750). In some embodiments, the controller (750) controls other functional units as described below and is functionally coupled to the other functional units. The coupling is not depicted for clarity. Parameters set by the controller (750) can include rate control related parameters (picture skip, quantizer, lambda value of rate-distortion optimization techniques, . . . ), picture size, group of pictures (GOP) layout, maximum motion vector search range, and so forth. The controller (750) may be configured to have other suitable functions that pertain to the video encoder (703) optimized for a certain system design.

In some example implementations, the video encoder (703) may be configured to operate in a coding loop. As an oversimplified description, in an example, the coding loop may include a source coder (730) (e.g., responsible for creating symbols, such as a symbol stream, based on an input picture to be coded, and a reference picture(s)), and a (local) decoder (733) embedded in the video encoder (703). The decoder (733) may reconstruct the symbols to create the sample data in a similar manner as a (remote) decoder also would create (as any compression between symbols and coded video bitstream is lossless in the video compression technologies considered in the disclosed subject matter). The reconstructed sample stream (sample data) may be input to the reference picture memory (734). As the decoding of a symbol stream leads to bit-exact results independent of decoder location (local or remote), the content in the reference picture memory (734) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (733) can be the same as of a "remote" decoder, such as the video decoder (610), which has already been described in detail above in conjunction with FIG. 6. Briefly referring also to FIG. 6, however, as symbols are available and encoding/decoding of symbols to a coded video sequence by an entropy coder (745) and the parser (620) can be lossless, the entropy decoding parts of the video decoder (610), including and parser (620) may not be fully implemented in the local decoder (733).

In various embodiments in the present disclosure, any decoder technology except the parsing/entropy decoding that is present in a decoder also may necessarily needs to be present, in substantially identical functional form, in a corresponding encoder. For this reason, the disclosed subject matter focuses on decoder operation. The description of encoder technologies may be abbreviated as they are the inverse of the comprehensively described decoder technologies. Only in certain areas a more detail description is required and provided below.

During operation, in some examples, the source coder (730) may perform motion compensated predictive coding, which codes an input picture predictively with reference to one or more previously coded picture from the video sequence that were designated as "reference pictures". In this manner, the coding engine (732) may code differences between pixel blocks of an input picture and pixel blocks of reference picture(s) that may be selected as prediction reference(s) to the input picture.

The local video decoder (733) may decode coded video data of pictures that may be designated as reference pictures, based on symbols created by the source coder (730). Operations of the coding engine (732) may advantageously be lossy processes. When the coded video data may be decoded at a video decoder (not shown in FIG. 7), the reconstructed video sequence typically may be a replica of the source video sequence with some errors. The local video decoder (733) replicates decoding processes that may be performed by the video decoder on reference pictures and may cause reconstructed reference pictures to be stored in the reference picture cache (734). In this manner, the video encoder (703) may store copies of reconstructed reference pictures locally that have common content as the reconstructed reference pictures that will be obtained by a far-end video decoder (absent transmission errors).

The predictor (735) may perform prediction searches for the coding engine (732). That is, for a new picture to be coded, the predictor (735) may search the reference picture memory (734) for sample data (as candidate reference pixel blocks) or certain metadata such as reference picture motion vectors, block shapes, and so on, that may serve as an appropriate prediction reference for the new pictures. The predictor (735) may operate on a sample block-by-pixel block basis to find appropriate prediction references. In some cases, as determined by search results obtained by the predictor (735), an input picture may have prediction references drawn from multiple reference pictures stored in the reference picture memory (734).

The controller (750) may manage coding operations of the source coder (730), including, for example, setting of parameters and subgroup parameters used for encoding the video data.

Output of all aforementioned functional units may be subjected to entropy coding in the entropy coder (745). The entropy coder (745) may translate the symbols as generated by the various functional units into a coded video sequence, by lossless compressing the symbols according to technologies such as Huffman coding, variable length coding, arithmetic coding, and so forth.

The controller (750) may manage operation of the video encoder (703). During coding, the controller (750) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

The video encoder (703) may perform coding operations according to a predetermined video coding technology or standard, such as ITU-T Rec. H.265. In its operation, the video encoder (703) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

In various embodiments, the mesh encoder (400) and the mesh decoder (500) above can be implemented with hardware, software, or combination thereof. For example, the mesh encoder (400) and the mesh decoder (500) can be implemented with processing circuitry such as one or more integrated circuits (ICs) that operate with or without software, such as an application specific integrated circuit (ASIC), field programmable gate array (FPGA), and the like. In another example, the mesh encoder (400) and the mesh decoder (500) can be implemented as software or firmware including instructions stored in a non-volatile (or non-transitory) computer-readable storage medium. The instructions, when executed by processing circuitry, such as one or more processors, causing the processing circuitry to perform functions of the mesh encoder (400) and/or the mesh decoder (500).

As described above, a raw 3D mesh or a portion/component of a raw 3D mesh may include a set of 3D vertices, also referred to as 3D geometry vertices, each vertex being associated with a 3D position in a 3D space (e.g., position or coordinate of each point in a point cloud). These 3D vertices may be connected to form edges and faces. The 3D mesh thus may also contain data indicating how these 3D geometry vertices are connected, referred to as connectivity of the 3D vertices. Similarly, a 2D mapping of the 3D mesh, such as a 2D texture mapping may include a set of 2D points, referred to as 2D coordinates that map to the 3D geometric vertices. The mapping between the 3D geometry vertices to the 2D coordinates may be one-to-one or one-to-many because one 3D geometry vertex may belong to more than one edge or face, which when projected into a 2D UV space, may be spatially separated. The 2D mapping may also contain connectivity information between the 2D coordinates. Such 2D connectivity may not be the same as but may bear correlation with the 3D connectivity. In the various disclosure below, 2D texture mapping and corresponding 2D texture coordinates are used as example. The underlying principles apply to any other types of 2D mapping.

In some example implementations for compressing the 3D positions, the 3D geometry vertices may be progressively scanned by the encoder and a position of a next 3D geometry vertex may be predictively encoded by one or more previous 3D geometry vertexes, referred to as reference vertices or predictor vertices. The encoder may reconstruct (just like what a decoder would do) the one or more previous 3D geometry vertices already encoded to obtain reconstructed positions (represented by 3D coordinates) and use these reconstructed 3D positions as reference positions to generate a position predictor (or, for simplification, a predictor) for the position of the next 3D geometry vertex. The encoder may then identify the actual 3D position of this next 3D geometry vertex and code it as, for example, a residual with respect to the predictor. The residual tends to be small in value statistically, taking advantage of the correlation between position of a 3D geometry vertex to its neighbours as predictors. Likewise, 2D coordinates of the 2D textual mapping may be coded in a similar fashion. In some specific implementations, the first vertex of the set of 3D geometry vertices or the first coordinate of the set of 2D coordinates of the 2D texture mapping may be predicted by a predefined position (e.g., by the 2D or 3D origin or by a signaled position); the reconstructed first position may be used to predict the position of the second 3D geometry vertex or 2D coordinate; the reconstructed positions of the first and second 3D geometry vertices or 2D coordinates may be used to predict a third 3D geometry vertex or 2D coordinate; the reconstructed positions of the first, second, and third 3D geometry vertices or 2D coordinates may be used to predict a fourth 3D geometry vertex or 2D coordinate; and finally and progressively, the reconstructed positions of the previous three 3D geometry vertices or 2D coordinates may be used to predict a next vertex or coordinate. In such examples, the steady-state number of previous 3D geometry vertices or 2D coordinates for predicting the next vertex or coordinate is three but that is non-limiting. Other numbers may be used.

Correspondingly, a decoder may progressively reconstruct one or more 3D geometry vertices or 2D coordinates, and then generate a predictor from these reconstructed one or more 3D vertices or 2D coordinates (reference positions of reference 3D vertices or 2D coordinates), and then extract the residual for the next 3D geometry vertex or 2D texture coordinate and reconstruct the position of the next 3D geometry vertex or 2D coordinate from the predictor and the extracted residual.

In some example implementations, the above process may be applied within each 3D mesh component of a plurality of mesh components. The term "mesh component" may be alternatively referred to as "submesh", representing any sub-unit of the 3D mesh. The various disclosed example implementations below can be applied to any geometry, attribute encoding regardless of polygonal mesh as well as traversal algorithm. The proposed methods can be used separately or may be combined in any forms.

In some example implementations for predicting a mesh position using other already encoded/reconstructed positions (e.g., neighboring positions or positions encoded/reconstructed preceding the current position to be encoded/reconstructed), a parallelogram extrapolation (alternatively referred to as parallelogram prediction) may be employed, as shown in FIG. 8.

In the context of polygonal meshes, parallelogram prediction has been found to perform optimally with quadrilateral meshes. In parallelogram prediction, as shown in FIG. 8, for a given polygonal mesh, the position of a vertex to be predicted (V) may utilize three previously encoded vertices (in an encoder) or previously reconstructed vertices (in a decoder), labeled as A, B, C, as references to estimate/predict the position of V (denoted by P) as follows:

$$P = w_0A + w_1B + w_2C,$$

where weighted factors are often chosen as $w_0=w_2=1$, $w_1=-1$, although other weighting factors may be employed in come situations.

Figure 8A:
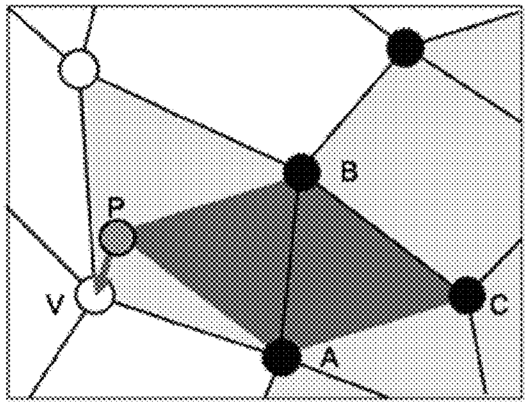
FIG. 8A and FIG. 8B illustrate an example in-face and cross-face parallelogram prediction.
Figure 8B:
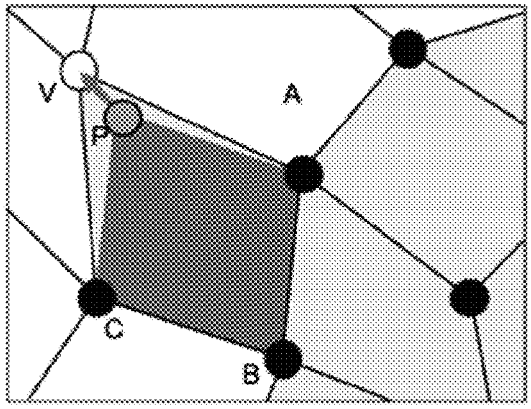

Within the context of polygonal meshes, parallelogram prediction can be categorized into two types: within prediction (alternatively referred to as in-face prediction) and cross prediction (alternatively referred to as cross-face prediction), as depicted in FIG. 8B and FIG. 8A, respectively. In an in-face prediction, all three reference vertices and the vertex to be predicted are situated within a same face of the 3D mesh, e.g., all of A, B, C, and P are on a same face in FIG. 8B. In cross-face prediction, the three reference vertices and the vertex to be predicted are situated on different facts of the 3D mesh, e.g., as shown FIG. 8A, vertex P (to be encoded) and encoded/reconstructed vertex C are not on a same face of the 3D mesh. Because parallelogram extrapolation or prediction generates predictor that is in-plane with the three reference positions, inherent prediction error may not be avoidable for predicting a current position that is out of the plane.

In some example implementations, multiple candidate reference positions and multiple reference modes may be provide for predicting a current position based on, for example, three already encoded/reconstructed positions. For example, to predict current vertex P from existing (already encoded/reconstructed) positions denoted by a0, b0 and c0, multiple prediction candidates may be specified (e.g., predefined) with multiple parallelogram predictions with different weights, such as:

$$SPred0 = \frac{1}{2}(P(a0) + 2P(b0) - P(c0))$$

$$SPred1 = \frac{1}{32}(24P(a0) + 29P(b0) - 21P(c0))$$

$$SPred2 = \frac{1}{32}(14P(a0) + 23P(b0) - 5P(c0))$$

$$SPred3 = \frac{P(a0) + P(b0)}{2}$$

$$SPred4 = P(a0) + P(b0) - P(c0)$$

$$SPred5 = P(b0)$$

$$SPred6 = P(a0)$$

The multiple reference modes may be further specified, with each reference mode essentially corresponding to reference set containing candidate reference positions selected from the available candidate reference positions above. The size of each reference set corresponding to one of the reference modes may be limited. For example, the size of the reference set may be 4. Example reference modes with selected candidate reference positions are shown below:

Mode0={SPred0, SPred4, SPred5, SPred6};

Mode1={SPred1, SPred4, SPred5, SPred6};

Mode2={SPred2, SPred4, SPred5, SPred6};

Mode3={SPred3, SPred4, SPred5, SPred6}.

For the example above, a reference mode at any level for the 3D mesh encoding may be signaled (e.g., signaled by mode index, which would be a 2-bit index for the example above). In some example implementations, the encoder can switch between reference modes with a predefined update period. Further, for a particular position or any other coding level, the actual reference position within a reference set may be signaled by index (for the example above, again, that in-set index may be of 2-bit).

In the further example implementations described below, alternative implementations are provided for determining the reference position set in order to provide candidate reference positions for more accurate position prediction and smaller residual for the encoded positions. Further, the construction of the reference position set may be adaptive adjusted during the encoding and decoding process. The reference position set may be derivable at both the encoder and decoder, thereby requiring no signaling in the bitstream. The various example implementations disclosed below may be applied to any geometry, attribute encoding regardless of polygonal mesh as well as traversal algorithm. The proposed methods can be used separately or in combination of any forms.

In some example implementations, the reference position set for position prediction may be constructed from a set of polar grid points relative to the three already encoded/reconstructed positions above. The set of polar grid points are determined as an angular and polar distance grid points. Position prediction based on such implementations may be referred to as angular and scale prediction (or angular prediction for simplicity). It provides an in-plane prediction alternative to simple parallelogram prediction.

Figure 9:
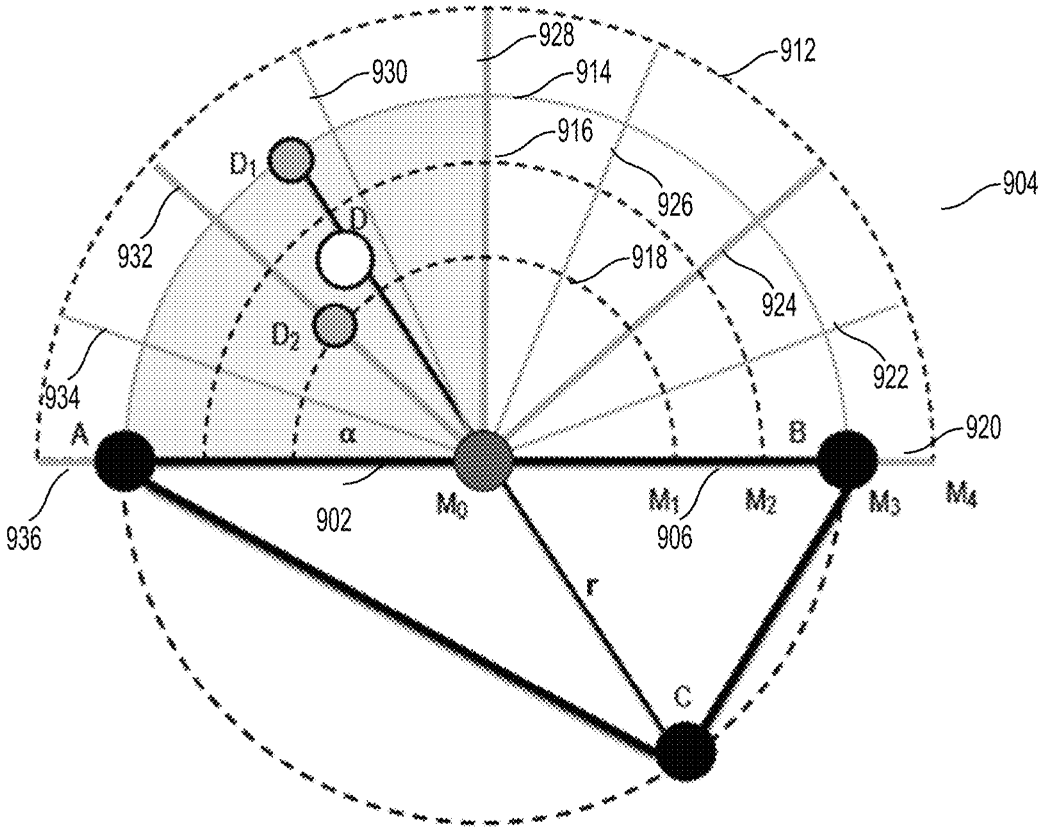
FIG. 9 illustrates an example angular prediction of a mesh position.

In these example implementations, the polar grid points as prediction candidates may be defined based on a set of angular modes $\alpha$ and a set of scale modes $\beta$ as illustrated in FIG. 9.

In the example illustration in FIG. 9, the already encoded or reconstructed positions A, B, C are illustrated in-plane, forming a triangle ABC. Further in FIG. 9, D represents the position to be predicted, whereas D1 represents a parallelogram extrapolation of ABC (e.g., using the weighted sum of positions A B and C as shown above). $M_0$ represents a mid-position between positions A and B, e.g., $$M_0 = \frac{A+B}{2}.$$

The distance between $M_0$ and C is represented by "r". Positions A, $M_0$ and B may form a polar axis 902 with $M_0$ being the polar origin. The angular and scale prediction reference positions may be generated within a half polar space 904 defined on a side of the polar axis AB that is opposite to position C and that encloses the parallelogram prediction D1 (the upper half space of FIG. 9). The set of scale modes within this half polar space, for example, may be represented by the half circles 912, 914, 916, and 918, whereas the set of angular modes may be represented by the radial lines in the upper half polar space, such as 920, 822, 924, 926, 928, 930, 932, 934, and 936. Intersections of the half circles and the radial lines may form the polar grid points that determine the reference position set that contains various candidate prediction positions for predicting position D.

Specifically, the angular modes (the radial lines starting from the polar origin $M_0$) may define a set of $n_A$ polar angles (polar angles of the radial lines 920 through 936) in the half polar space. The set of $n_A$ polar angles corresponding to the set of angular modes may range from $\alpha_0=0$ (represented by radial line 920) to $\alpha_{n_A-1}=\pi$ (represented by radial line 936). In some non-limiting examples, as shown in FIG. 9, these polar angles or angular modes may be evenly spaced such that the candidate reference positions are uniformly distributed angularly. The number of angular modes or the angular spacing between adjacent angular mode may be predefined or may be signaled in the bitstream.

Specifically, the set of $n_S$ scale modes may be scaled versions of the radius $r=|M_0-C|$, the scaling factor for these scale modes may range from mode $\beta_0=0$ to $\beta_{n_s-1}$. In some examples, the difference between adjacent $\beta$s may be the same (e.g., the $\beta$s may be evenly spaced from one to another). The number of $\beta$s (or scale modes) and/or the maximum sale ($\beta_{n_s-1}$) may be predefined or signaled in the bitstream.

In one particular non-limiting embodiment, the proposed angular modes may include: [0, 45 degrees, 90 degrees, 135 degrees, 180 degrees](or [0, $\pi/4$, $\pi/2$, $3\pi/4$, $\pi$]. In one particular embodiment, the scale modes or scale factors to scale r may be [0.5, 0.75, 1.0, 1.25].

In some example implementations, implementations, all of these grid points may together form the reference set. Such a reference set is derivable both at the encoder and the decoder, as long as $n_A$ and $n_S$ are known (e.g., predefined or signaled). The total number of candidate reference positions in the reference position set would be $n_A*n_S$. In some other example implementations, the $M_0$ may be also added to the reference position set, thereby providing a total of $n_A*n_S+1$ candidate reference positions in the reference position set.

For the encoder, the best candidate reference position may be selected by identifying the candidate reference position in the reference position set having the most accurate prediction of D (the smallest residual) and signal the index of the selected candidate reference position among the candidate reference positions in the reference position set. For the decoder, after deriving the reference position set, the candidate reference index may be extracted from the bitstream for a current position, and then the current position may be decoded using the corresponding candidate reference position and the residual of the current position as extracted from the bitstream. These reference positions in the reference position set may be order by a predefined scanning rule, and a single index may be used to specify a selected candidate reference position. Alternatively, angular index and scale index may be separately signaled to indicate the location of the selected candidate reference position in the angular dimension and the radial dimension, respectively. An example of optimal reference position for predicting D is shown as the grid point $D_2$ in FIG. 9.

In some example implementations, not all of the polar grid points above may be included in the reference position set. For example, a total number of reference positions in the reference position set may be limited to N. N may be predefined or signaled. For example, N may be an integer power of 2 (e.g., for signaling efficiency). At both the encoder and the decoder, the N reference positions may be selected from the polar grid points above to form the reference position set using a known rule. As one example, the N−1 polar grid points nearest to the parallelogram prediction position $D_1$ may be identified and included he the reference position set together with $M_0$, as shown below.

Specifically, assuming the prediction is near the parallelogram prediction $D_1$. Only N−1 predictions are selected as part of reference prediction set (other than $M_0$):

$$\underset{i\in[0,n_A-1],j\in[0,n_S-1]}{\operatorname{argmin}} |P(\alpha_i, \beta_j) - D_1|, \text{ total} = N-1,$$

where $P(\alpha_i, \beta_j)$ represents the polar grid points, and the mathematical process above represents selecting the grid points according to smallest distance to D1 up to selection of N−1 polar grid points.

In some other example implementations, given the total number of N−1 reference positions to be included in the reference position set, the grid points containing the N−1 reference positions may be adaptively determined. The optimal reference position selection based on such an approach may be referred to as adaptive angular prediction (or adaptive planar angular prediction, since this prediction scheme, like the examples above, is planar in nature).

For example, a range of angular spread and/or radial spread may be predefined or signaled, and then only the polar grid points within the corresponding angular range and radial range are included in the reference position set. In some example implementations, the angular spread may be provided as a deviation from the nearest angular mode to D1. Similarly, the radial spread may be provided as a deviation from the nearest radial mode to D1. In that situation.

For another example, N−1 polar grid points may be adaptively derived with corresponding grid spacing in the angular dimension and radial dimension in the angular range and the radial range. The N−1 adaptively determined polar grid points together with $M_0$ may then be considered as the collection of the reference position set. The angular spread for determining the angular range may be provided as a deviation from the angular location of D1 or a course angular grid line closest to D1. Similarly, the radial spread may be provided as a deviation from the radial location of D1 or a course radial grid line closet to D1. In such a manner, assuming a relatively high confidence of the initial prediction position (e.g., parallelogram prediction D1), the candidate reference positions are provided with higher angular and radial resolution (the N−1 reference positions are distributed and concentrated in the angular range and the radial range rather than the entire half polar space), and thus potentially enable more accurate prediction and smaller residual.

Example steps performed by an encoder may include:

Step 1, Estimate initial prediction of P, e.g., parallelogram prediction D1.

Step 2, define the search range adaptively for α, β as:

Firstly, the angular position of the parallelogram or nearest initial angular grid line to D1 is selected as the primary angle, $\alpha_p$. Then the search angle for prediction candidates is expanded accordingly in both sides of the primary angle in the angular list to define the search range. For example, given that the angular deviation to setting the angular range is Aa, then the reduced angular range space from the half polar space, $\mathcal{P}_A$ is:

$$\mathcal{P}_A \in [\alpha_{min}, \alpha_{max}]$$

$$\alpha_{min} = \max(0, \alpha_p - \Delta\alpha), \alpha_{max} = \min(\pi, \alpha_p + \Delta\alpha)$$

Note that the angular range goes on either side of the primary angle, $\alpha_p$ by Δα and clipped by 0 and π. By doing so, it is possible to increase the angular resolution, thereby increasing the prediction accuracy.

Secondly, depending on the historical regularity of previous encoded position, the scale is adjusted properly. The most preferred scale is updated during the encoding vertex. This will be used as the primary scale mode $\beta_p$. Then, similar to angular mode, scale mode range is defined as $\mathcal{P}_S$.

$$\mathcal{P}_S \in [\beta_{min}, \beta_{max}]$$

$$\beta_{min} = \max(0, \beta_p - \Delta\beta), \beta_{max} = \min(\beta_{max}, \beta_p + \Delta\beta)$$

where $\beta_{max}$ is the maximum radial scale (e.g., 1.25 in the example above), and Δβ is the scale deviation on either side of the primary radial scale $\beta_p$. Again, the radial scale range is clipped at 0 and $\beta_{max}$.

Step 3. The higher resolution grid points may be constructed withing the angular range and the radial scale range to provide N−1 higher resolution grid points. Order and index the predictors corresponding to their distance to the initial prediction, with, for example, angular has higher order than scale.

Step 4. identify the best prediction reference (e.g., smallest residual) for D, and signal the local prediction index.

Correspondingly, on the decoder side, Step 1 to step 3 may be performed at decoder side, therefore the reference positions can be derived and no additional signaling is needed. By doing so, the prediction accuracy could be enhanced without compromising (increasing) the signaling overhead.

Figure 10:
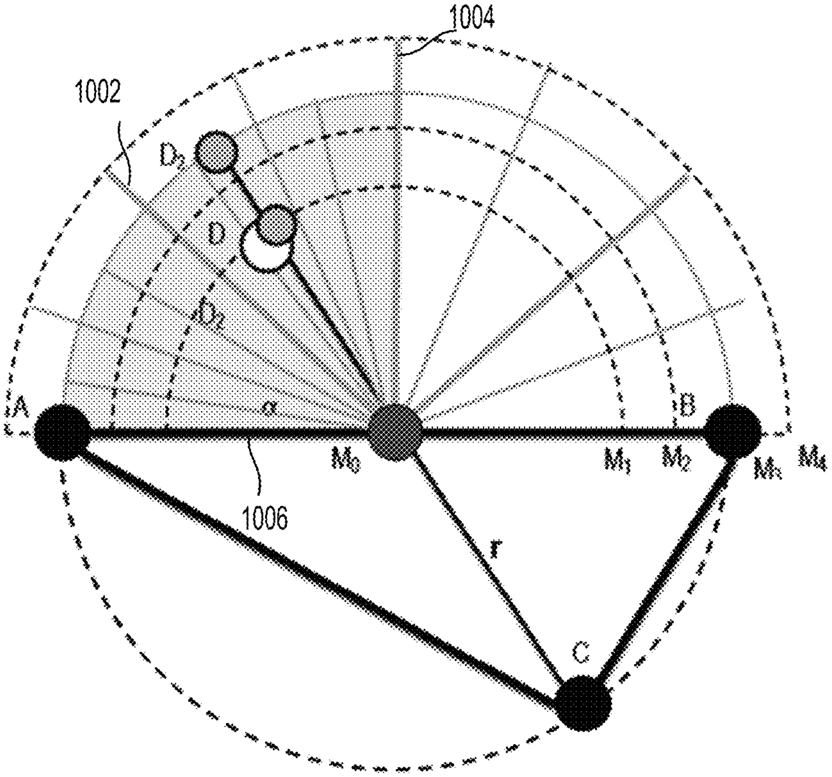
FIG. 10 illustrates an example adaptive angular prediction of a mesh position.

Such example implementations are illustrated in FIG. 10. In FIG. 10, the radial scale range is from 0 to 1. For the angular range, the primary angle $\alpha_p$ is indicated as 1002, which is the initial grid line (among, e.g., [0, π/4, π/2, 3π/4, π] above) that is nearest to D2. The angular range is then expanded to between 1006 and 1004. After that, the higher resolution angular and radial grid lines are derived to provide N−1 reference positions (as shown in FIG. 10, for example, by the denser angular grid lines).

Alternative to FIG. 10, the primary angle may be derived as the angular position of D2 (rather than the nearest initial angular grid line), and the angular range may be expanded to either side of this primary angle.

In some further example implementations, the nearest predictor to the initial predictor (parallelogram predictor) for form the ordered reference position set may be designed in similar pattern to motion vector search order in video coding. Skewed diamond structure and hexagon structure may be used.

Figure 11:
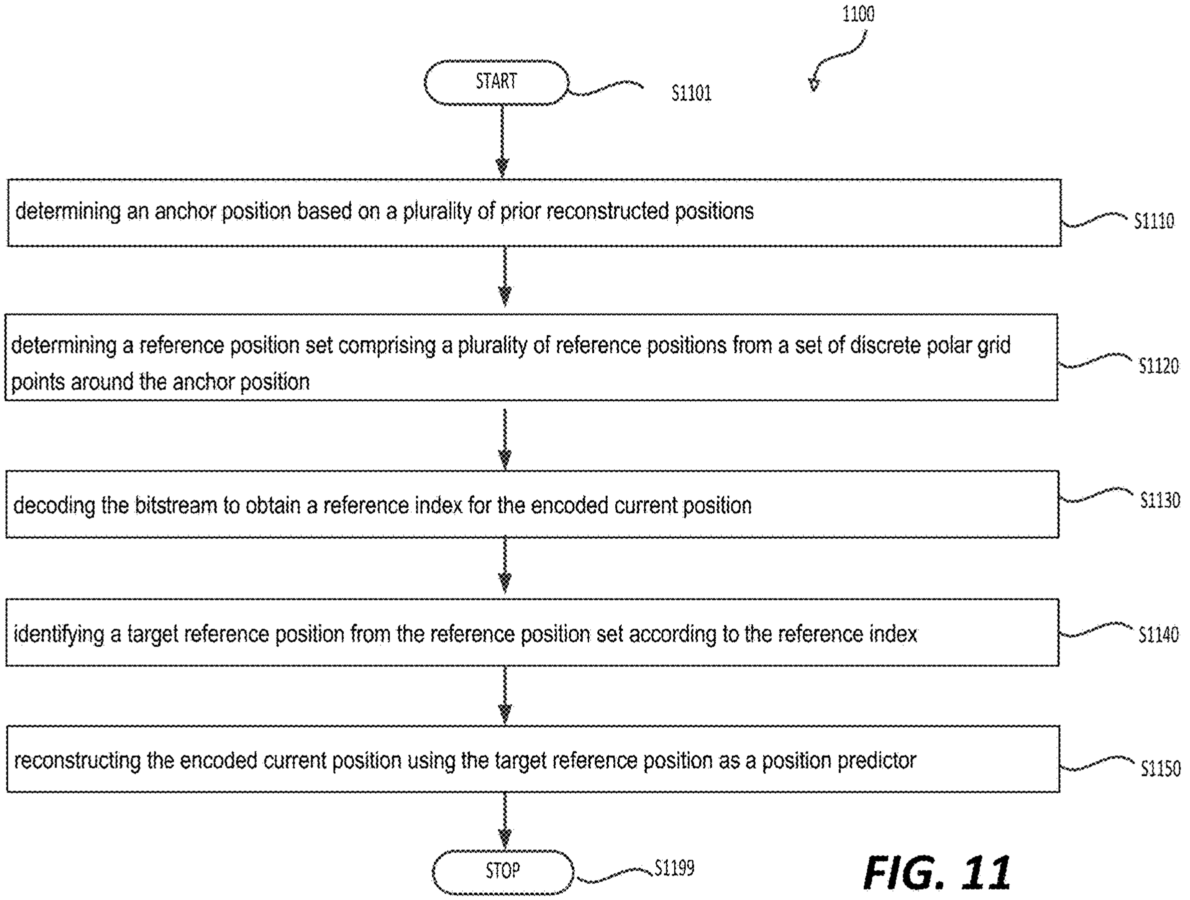
FIG. 11 illustrate an example flow chart for decoding a 3D mesh.

FIG. 11 shows a flow chart for an example process (1100) according to an embodiment of the disclosure. The process (1100) starts at step (S1101). In Step (S1110), an anchor position based on a plurality of prior reconstructed positions is determined. In Step (S1120), a reference position set comprising a plurality of reference positions from a set of discrete polar grid points around the anchor position is determined. In Step (S1130), the bitstream is decoded to obtain a reference index for the encoded current position. In Step (S1140), a target reference position is identified from the reference position set according to the reference index. In Step (S1150), the encoded current position is reconstructed using the target reference position as a position predictor. The procedure (1100) stops at (S1199).

Figure 12:
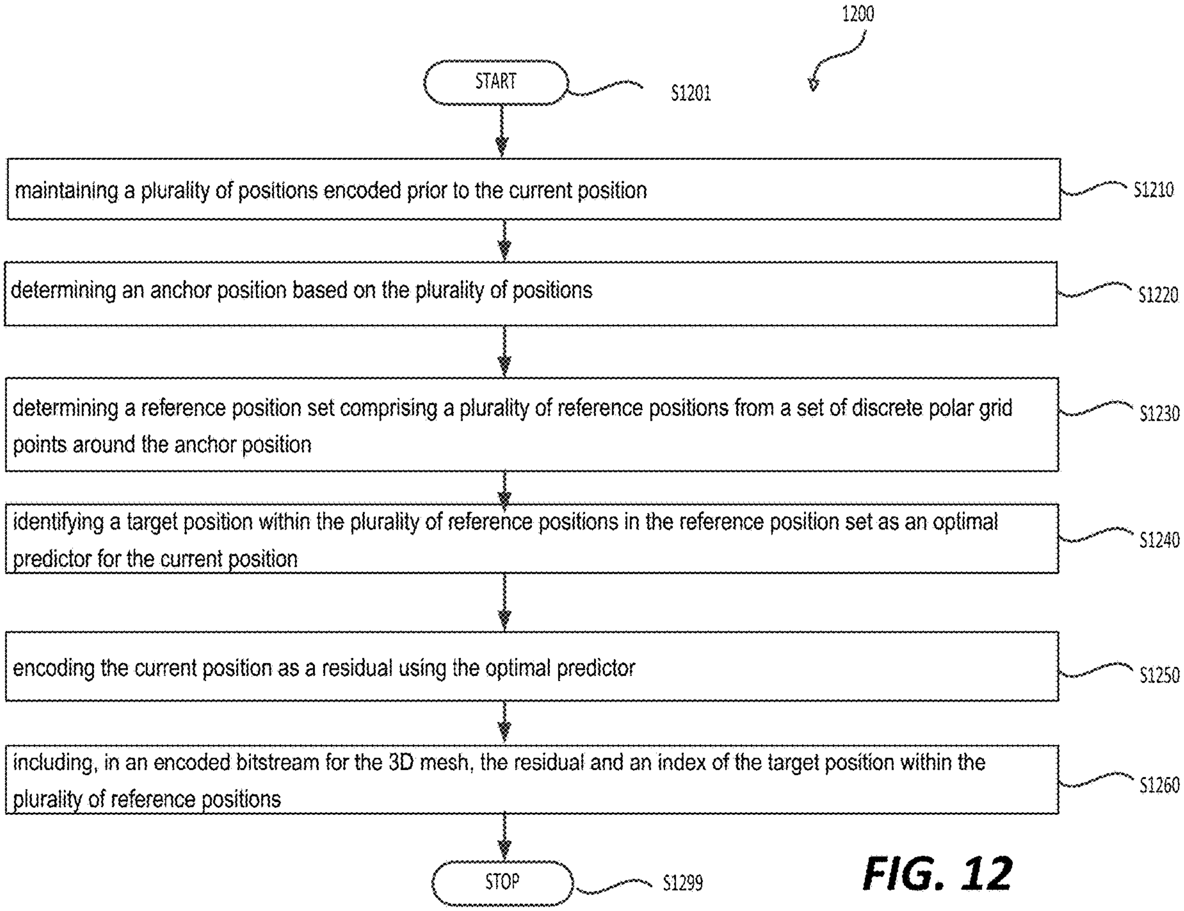
FIG. 12 illustrates an example flow chart for encoding a 3D mesh.

FIG. 12 shows a flow chart for an example process (1200) according to an embodiment of the disclosure. The process (1200) starts at step (S1201). In Step (S1210), a plurality of positions encoded prior to the current position are maintained. In Step (S1220), an anchor position based on the plurality of positions is determined. In Step (S1230), a reference position set comprising a plurality of reference positions from a set of discrete polar grid points around the anchor position is determined. In Step (S1240), a target position within the plurality of reference positions in the reference position set is identified as an optimal predictor for the current position. In Step (S1250), the current position is encoded as a residual using the optimal predictor. In Step (S1260), the residual and an index of the target position within the plurality of reference positions is included in an encoded bitstream for the 3D mesh. The procedure (1200) stops at (S1299).

The processes (1100) and (1200) can be suitably adapted. Step(s) in the processes (1100), and (1200) can be modified and/or omitted. Additional step(s) can be added. Any suitable order of implementation can be used.

The techniques disclosed in the present disclosure may be used separately or combined in any order. Further, each of the techniques (e.g., methods, embodiments), encoder, and decoder may be implemented by processing circuitry (e.g., one or more processors or one or more integrated circuits).

In some examples, the one or more processors execute a program that is stored in a non-transitory computer-readable medium.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
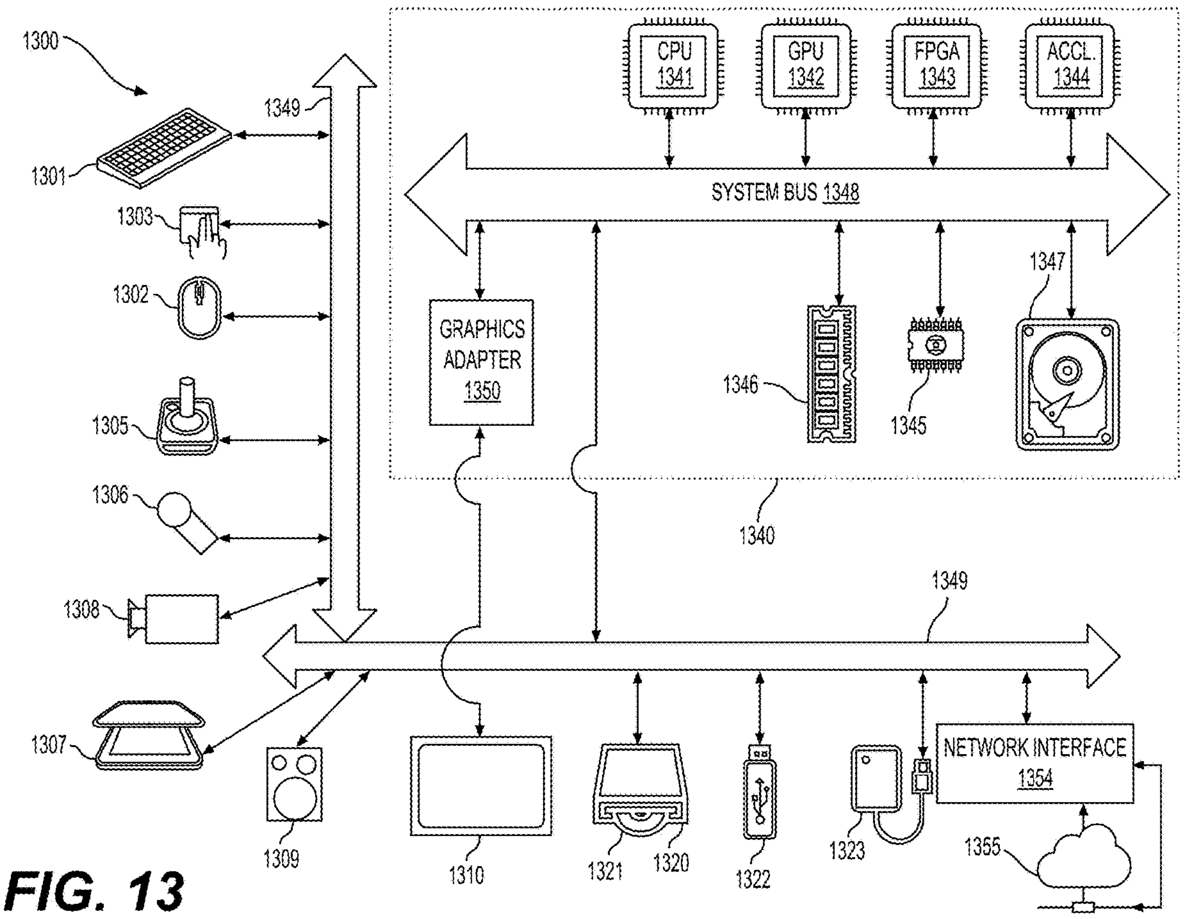
FIG. 13 is a schematic illustration of an example computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general-purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition, or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for reconstructing an encode current position from a bitstream of a 3D mesh, comprising:
- determining an anchor position based on a plurality of prior reconstructed positions, wherein the plurality of prior reconstructed positions comprise a first position, a second position, and a third position reconstructed immediately prior to reconstructing the encoded current position, and wherein the anchor position is derived as a mid-position between the first position and the second position;
- determining a reference position set comprising a plurality of reference positions from a set of discrete polar grid points around the anchor position, wherein the set of discrete polar grid points are distributed in a target polar space within a half polar space that is opposite to the third position from a polar axis formed by the first position, the second position, and the anchor position with the anchor position being a polar origin;
- decoding the bitstream to obtain a reference index for the encoded current position;
- identifying a target reference position from the reference position set according to the reference index; and
- reconstructing the encoded current position using the target reference position as a position predictor.

2. The method of claim 1, wherein the plurality of reference positions in the reference position set comprise N reference positions, N being predefined or signaled in the bitstream.

3. The method of claim 1, wherein the set of discrete polar grid points are even in angular distribution in the half polar space.

4. The method of claim 3, wherein the set of discrete polar grid points are angularly located at 0, $\pi/4$, $\pi/2$, $3\pi/4$, and $\pi$ around the anchor position in the half polar space.

5. The method of claim 1, wherein the set of discrete polar grid points are in even distribution radially away from the anchor position in the half polar space.

6. The method of claim 5, wherein the set of discrete polar grid points are located radially away from the anchor position by scaling a distance between the anchor position and the third position by a predefined set of evenly spaced scaling factors.

7. The method of claim 6, wherein the predefined set of evenly spaced scaling factors are 0.5, 0.75, 1.0, and 1.25.

8. The method of claim 1, further comprising:
- determining an initial reference position for the encoded current position in the half polar space; and
- determining the N reference positions in the reference position set by identifying N of the set of discrete polar grid points nearest to the initial reference position.

9. The method of claim 8, wherein the initial reference position is determined using a parallelogram extrapolation based on the first position, the second position, and the third position.

10. The method of claim 1, further comprising:
- determining an angular range and a radial range in the half polar space for the N reference positions in the reference position set; and
- deriving the N reference positions as N discrete polar grid points within the angular range and the radial range in the half polar space.

11. The method of claim 10, wherein the N discrete polar grid points are in even distribution angularly and radially.

12. The method of claim 10, further comprising:
- determining an angular width parameter and/or a radial width parameter, the angular width parameter and/or the radial width parameter being predefined or signaled in the bitstream;

determining an initial reference position for the encoded current position in the half polar space; and
- applying the angular width parameter to the initial reference position with clipping between 0 and $\pi$ to obtain the angular range and/or applying the radial width parameter to the initial reference position with clipping between 0 and a maximum radius to obtain the radial range.

13. The method of claim 12, wherein the initial reference position is determined using a parallelogram extrapolation based on the first position, the second position, and the third position.

14. A method for encoding a current position a 3D mesh, comprising:

maintaining a plurality of positions encoded prior to the current position, wherein the plurality of positions comprise a first position, a second position, and a third position encoded immediately prior to the current position;

determining an anchor position based on the plurality of positions, wherein the anchor position is derived as a mid-position between the first position and the second position;

determining a reference position set comprising a plurality of reference positions from a set of discrete polar grid points around the anchor position, wherein the set of discrete polar grid points are distributed in a target polar space within a half polar space that is opposite of the third position from a polar axis formed by the first position, the second position, and the anchor position with the anchor position being a polar origin;

identifying a target position within the plurality of reference positions in the reference position set as an optimal predictor for the current position;

encoding the current position as a residual using the optimal predictor; and including, in an encoded bitstream for the 3D mesh, the residual and an index of the target position within the plurality of reference positions.

15. The method of claim 14, wherein the plurality of reference positions in the reference position set comprise N reference positions, N being predefined or signaled in the encoded bitstream.

16. The method of claim 14, further comprising:

determining an angular range and a radial range in the half polar space for the N reference positions in the reference position set; and deriving the N reference positions as N evenly distributed discrete polar grid points within the angular range and the radial range in the half polar space.

17. The method of claim 16, further comprising:

determining an angular width parameter and/or a radial width parameter, the angular width parameter and/or the radial width parameter being predefined or signaled in the encoded bitstream;

determining an initial reference position for encoding the current position in the half polar space, the initial reference position is determined using a parallelogram extrapolation based on the first position, the second position, and the third position; and applying the angular width parameter to the initial reference position with clipping between 0 and $\pi$ to obtain the angular range and/or applying the radial width parameter to the initial reference position with clipping between 0 and a maximum radius to obtain the radial range.

18. A method for encoding a 3D mesh, the method comprising encoding a 3D mesh, the method comprising encoding and transmitting a bitstream of the 3D mesh according to a format rule, wherein the bit stream includes a reference index for a current position of the 3D mesh, and wherein the method further comprises:

maintaining a plurality of positions encoded prior to the current position, wherein the plurality of positions comprise a first position, a second position, and a third position encoded immediately prior to the current position;

determining an anchor position based on the plurality of positions, wherein the anchor position is derived as a mid-position between the first position and the second position;

determining a reference position set comprising a plurality of reference positions from a set of discrete polar grid points around the anchor position, wherein the set of discrete polar grid points are distributed in a target polar space within a half polar space that is opposite of the third position from a polar axis formed by the first position, the second position, and the anchor position with the anchor position being a polar origin;

identifying a target position within the plurality of reference positions in the reference position set as an optimal predictor for the current position;

encoding the current position as a residual using the optimal predictor; and including, in an encoded bitstream for the 3D mesh, the residual and an index of the target position within the plurality of reference positions.

* * * * *